(12) United States Patent
Lee et al.

(10) Patent No.: US 10,773,686 B2
(45) Date of Patent: Sep. 15, 2020

(54) CARD-TYPE VEHICLE SMART KEY AND CONTROL METHOD THEREFOR

(71) Applicant: Continental Automotive GmbH, Hannover (DE)

(72) Inventors: BokHee Lee, Icheon-si (KR); HyoungLack Jung, Yongin-si (KR)

(73) Assignee: Continental Automotive GmbH (DE)

( * ) Notice: Subject to any disclaimer, the term of this patent is extended or adjusted under 35 U.S.C. 154(b) by 0 days.

(21) Appl. No.: 16/336,545

(22) PCT Filed: Oct. 13, 2017

(86) PCT No.: PCT/KR2017/011309
§ 371 (c)(1),
(2) Date: Mar. 26, 2019

(87) PCT Pub. No.: WO2018/070825
PCT Pub. Date: Apr. 19, 2018

(65) Prior Publication Data
US 2020/0172053 A1    Jun. 4, 2020

(30) Foreign Application Priority Data
Oct. 14, 2016   (KR) .......................... 10-2016-0133657

(51) Int. Cl.
*B60R 25/24* (2013.01)
*H04W 4/80* (2018.01)
*G07C 9/00* (2020.01)

(52) U.S. Cl.
CPC .......... *B60R 25/24* (2013.01); *G07C 9/00674* (2013.01); *G07C 9/00714* (2013.01); *H04W 4/80* (2018.02); *G07C 2009/00976* (2013.01)

(58) Field of Classification Search
CPC ..... B60R 25/24; H04W 4/80; G07C 9/00674; G07C 2009/00976; G07C 9/0069; G06K 19/0718
See application file for complete search history.

(56) References Cited

U.S. PATENT DOCUMENTS

| | | | |
|---|---|---|---|
| 6,377,160 B1* | 4/2002 | Groeger | H04B 1/082 307/10.1 |
| 2006/0049922 A1* | 3/2006 | Kolpasky | B60R 25/33 340/426.13 |

(Continued)

FOREIGN PATENT DOCUMENTS

| | | |
|---|---|---|
| EP | 1647941 A1 | 4/2006 |
| JP | 2000124626 A | 4/2000 |

(Continued)

OTHER PUBLICATIONS

International Search Report and Written Opinion for International Application No. PCT/KR2017/011309, dated Jan. 15, 2018—9 pages.

(Continued)

*Primary Examiner* — Emily C Terrell
(74) *Attorney, Agent, or Firm* — RatnerPrestia

(57) ABSTRACT

A vehicle card-type smart key that it includes a tact switch; and a touch input unit for sensing a touch from a user; and a control unit which performs an action related to the button input only when both a button input from said tact switch and a touch input from the touch input unit exist.

12 Claims, 2 Drawing Sheets

(56) References Cited

U.S. PATENT DOCUMENTS

| | | | | |
|---|---|---|---|---|
| 2013/0086389 A1* | 4/2013 | Suwald | ............... | G06Q 20/341 |
| | | | | 713/185 |
| 2013/0231046 A1* | 9/2013 | Pope | ................. | G06K 9/00013 |
| | | | | 455/41.1 |
| 2013/0338883 A1* | 12/2013 | Savoure | ................. | B60R 25/00 |
| | | | | 701/49 |
| 2014/0058586 A1* | 2/2014 | Kalhous | ............. | G07C 9/00309 |
| | | | | 701/2 |
| 2015/0042454 A1* | 2/2015 | Lee | ................... | G07C 9/00182 |
| | | | | 340/5.72 |
| 2016/0063784 A1 | 3/2016 | Murakami et al. | | |
| 2016/0217633 A1 | 7/2016 | Jang | | |
| 2017/0018132 A1* | 1/2017 | Seagraves | .......... | G07C 9/00309 |

FOREIGN PATENT DOCUMENTS

| | | | |
|---|---|---|---|
| JP | 2004241476 A | 8/2004 | |
| JP | 2011021319 A | 2/2011 | |
| JP | 2012087511 A | 5/2012 | |
| KR | 20120116563 A | 10/2012 | |
| KR | 101406988 B1 | 7/2014 | |
| KR | 20150068166 A | 6/2015 | |
| KR | 101549677 B1 | 9/2015 | |
| KR | 20150130929 A | 11/2015 | |
| KR | 20160026199 A | 3/2016 | |

OTHER PUBLICATIONS

Korean Grant of Patent for Korean Application No. 10-2016-0133657, dated May 30, 2018—5 pages.

\* cited by examiner

CARD-TYPE VEHICLE SMART KEY AND CONTROL METHOD THEREFOR

CROSS REFERENCE TO RELATED APPLICATIONS

This application is the U.S. National Phase Application of PCT International Application No. PCT/KR2017/011309, filed Oct. 13, 2017, which claims priority to Korean Patent Application No. 10-2016-0133657, filed Oct. 14, 2016, the contents of such applications being incorporated by reference herein.

FIELD OF THE INVENTION

The present invention is a technique relating to a vehicle card-type smart key and a control method thereof. More specifically, the present invention is a technique relating to a vehicle card-type smart key and a control method thereof which can perform an action related to a button input only when both a tact switch input and a touch input exist.

BACKGROUND OF THE INVENTION

Lately, a smart key is generally used in a vehicle and the smart key can also open the car door or start the vehicle without a key blade.

An existing vehicle smart key performs a remote lock function and a lock opening function by installing a tact switch on a printed circuit board inside an external housing and an ON/OFF button exposed outside the housing as required for the function of remote keyless entry.

However, for facilitating storage recently, a card-type smart key being thinner than the thickness of the existing smart key is applicable. The thickness of such a card-type smart key is below 4 mm, and it is manufactured by covering the outside with a flowing material by molding or potting, and then the flowing material is solidified to become a card-type key.

With regard to the background art of the present invention, there is the technique of "A smart key system, and its vehicle control device and method" disclosed in the Korean patent publication No. 10-2012-0116563 (Oct. 23, 2012), incorporated herein by reference.

SUMMARY OF THE INVENTION

Technical Issues to Solve

The initial vehicle card-type smart key possesses a tact switch constituting a button input. During use of the tact switch, there is a problem of starting the vehicle unintentionally by pressing it when not required.

For example, after the tact switch is pressed when not required, the door is opened, which may cause occurrence of theft and other problems. Moreover, because of electricity use by generating a current when unneeded, it has the problem of shortening battery life.

An aspect of the present invention is a technique created for solving the above problem. An aspect of the present invention is: providing a vehicle card-type smart key and a control method thereof which performs an action by a button input only when both a physical button input of the tact switch and a touch input from the touch input unit exist.

Another aspect of the present invention is: providing a vehicle card-type smart key and a control method thereof which performs an action only when there is a button input from the user so as to avoid an unintentional car start and to proactively prevent the phenomenon of shortening the battery life by generating an unnecessary current.

Technical Solutions

According to one aspect of the present invention, the vehicle card-type smart key is characterized in that: it includes a tact switch; and a touch input unit for sensing a touch from a user; and a control unit which performs an action related to a button input only when both the button input of said tact switch and a touch input from said touch input unit exist.

An aspect of the present invention is characterized in that: said tact switch and said touch input unit are stacked.

An aspect of the present invention is characterized in that: said touch input unit is embodied in said printed circuit board and said tact switch is installed on said touch input unit.

An aspect of the present invention is characterized in that: said touch input unit is a capacitive sensor.

An aspect of the present invention is characterized in that: as long as the time of pressing said tact switch exceeds the chattering time that has been set, said control unit will cause said touch input unit to be in an enable state.

An aspect of the present invention is characterized in that: within the touch input time of said touch input unit, in order to minimize the chance of an error occurring due to the environment, said control unit performs calibration of the touch input performed through said touch input unit.

An aspect of the present invention is characterized in that: said control unit performs an action related to a button input as long as both the button input of said tact switch and a touch input of said touch input unit exist at the same time.

An aspect of the present invention is characterized in that: said control unit performs an action related to a button input as long as the duration of the button input of said tact switch and the touch input of said touch input unit exceeds the time that has been set.

An aspect of the present invention is characterized in that: said control unit enters a sleep mode after performing the action related to the button input.

According to one aspect of the present invention, the control method of the vehicle card-type smart key is characterized in that: it includes a stage for the control unit to cause the touch input unit to be in an enable state when a button input is performed through the tact switch; and a stage wherein, when there is a touch input from said touch input unit, said control unit will perform an action related to the button input of said touch input unit.

An aspect of the present invention is characterized in that: as long as the time of pressing said tact switch exceeds the chattering time that has been set, said control unit will cause said touch input unit to be in an enable state.

An aspect of the present invention is characterized in that: within the touch input time of said touch input unit, in order to minimize the chance of an error occurring due to the environment, said control unit performs calibration of the touch input performed through said touch input unit.

An aspect of the present invention is characterized in that: whenever a button input of said tact switch and a touch input of said touch input unit exist at the same time, said control unit will perform an action related to the button input.

An aspect of the present invention is characterized in that: when the duration of the button input of said tact switch and the touch input of said touch input unit exceeds the time that has been set, said control unit will perform an action related to the button input.

Effects of the Invention

The vehicle card-type smart key and the control method thereof in one aspect of the present invention perform an action related to a button input only when both a physical button input of the tact switch and a touch input of the touch input unit exist, so that the chance for an unintentional car start to be caused by a button input is minimized.

The vehicle card-type smart key and the control method thereof in one aspect of the present invention perform an action only for a button input from the user; thus an unintentional car start can be avoided and the phenomenon of shortening the battery life caused by generating an unnecessary current is proactively prevented.

DETAILED DESCRIPTION OF THE PREFERRED EMBODIMENTS

Figure 1:
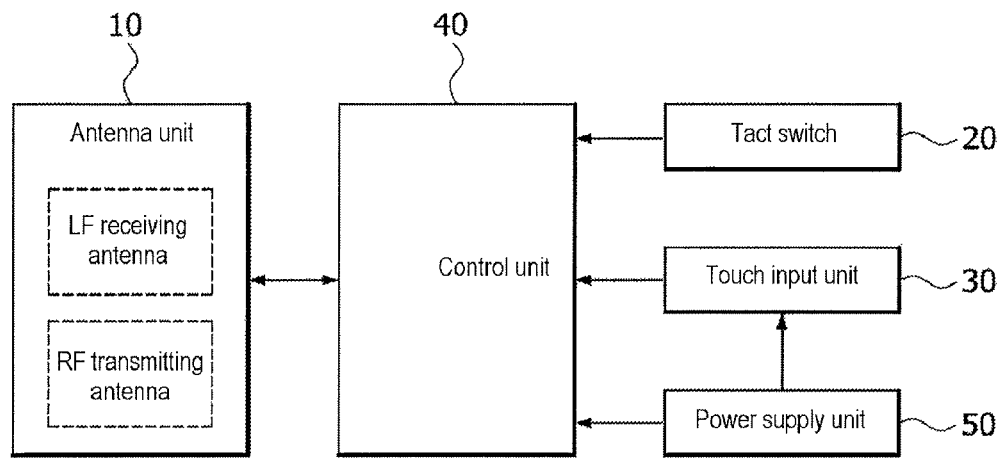
FIG. 1 is a block structure diagram of a vehicle card-type smart key in one embodiment of the present invention.

Next, the vehicle card-type key and the control method thereof according to one embodiment of the present invention are described by referring to the attached drawings. In the specification, for a clear and easy depiction, the thickness of a center line or a size of a component are expanded in the drawings. Furthermore, the terms described later are terms defined after their functions in an aspect of the present invention are considered and may differ according to the intention or practice of a user and operator. The terms shall be defined in the context of all contents of the specification.

Figure 2:
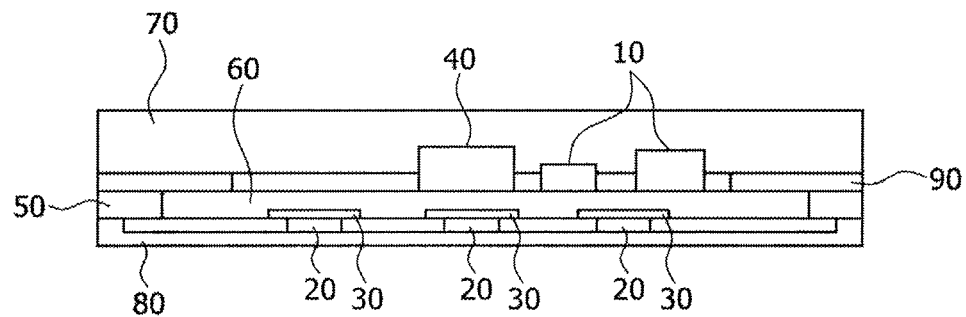
FIG. 2 is a structure diagram of a vehicle card-type smart key in one embodiment of the present invention.
Figure 3:
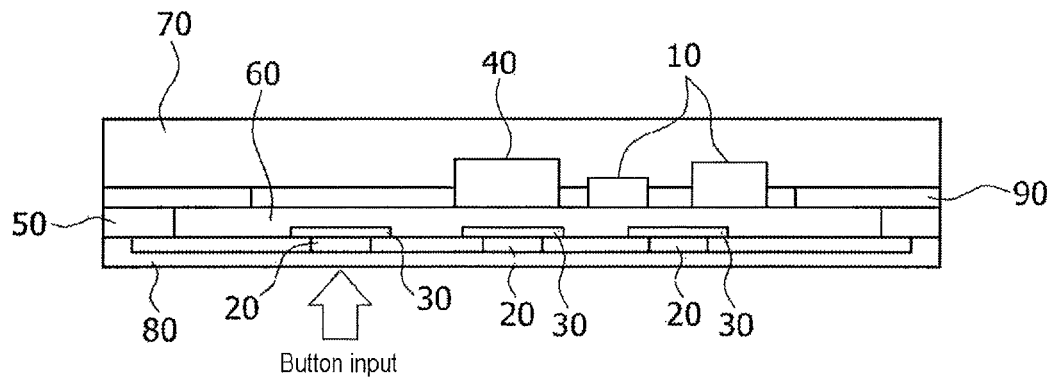
FIG. 3 is a schematic drawing of a button input example of a vehicle card-type smart key in one embodiment of the present invention.

FIG. 1 is a block structure diagram of a vehicle card-type smart key in one embodiment of the present invention. FIG. 2 is a structure diagram of a vehicle card-type smart key in one embodiment of the present invention. FIG. 3 is a schematic drawing of a button input example of a vehicle card-type smart key in one embodiment of the present invention.

As shown from FIG. 1 to FIG. 3, in one embodiment of the present invention, the vehicle card-type smart key comprises an antenna unit (10), a tact switch (20), a touch input unit (30), a control unit (40), a power supply unit (50), a printed circuit board (60), a casing (70), a seat (80) and a mechanical key (90).

The antenna unit (10) comprises an LF antenna (Low Frequency Antenna) and an RF antenna (Radio Frequency Antenna) inside and receives and transmits various control instructions by performing a PKE system (not shown) and wireless communication of the vehicle.

The tact switch (20) is made in a mechanical button form. According to pressing operation of the user, a button signal is input to the control unit (40).

When the user presses the tact switch (20), the touch input unit (30) senses the touch of the user. In view of this, the touch input unit (30) is installed on the tact switch (20) and the printed circuit board (60). However, for sensing the body part of the user contacting the tact switch (20), it can be stacked under the tact switch (20).

As shown in FIG. 2, the touch input unit (30) is embodied on the printed circuit board (60) and the tact switch (20) is installed on the touch input unit (30). In this way, when the user presses the tact switch (20), as the tact switch (20) is pressed, the touch input unit (30) senses the touch of the user, and the control unit (40) is able to receive a button signal of the tact switch (20) and a touch signal of the touch input unit (30) generated by the button pressing operation of the user. The touch input unit (30) can be a capacitive sensor.

The power supply unit (50) supplies power to the control unit (40) and the touch input unit (30) and the like.

The casing (70) protects the antenna unit (10), control unit (40), touch input unit (30) and tact switch (20) as well as other components inside after being formed through molding.

The seat (80) is formed on the top of the tact switch (20) and can perform the pressing operation of the tact switch (20).

When there is a failure of opening the door (not shown) or other emergency situation occurs due to power supply discharging of the power supply unit (50) or an error of the control unit (40), the mechanical key (90) is prepared in order to access the vehicle. The door can be opened after the mechanical key (90) is inserted into the door etc.

Depending on whether both a physical button input by pressing the tact switch (20) and a touch input from the touch input unit (30) installed on the tact switch (20) exist at the same time and whether these button input and touch input are maintained for the preset time, the control unit (40) will perform an action related to the button input.

More specifically, the control unit (40) confirms whether the time of the pressing of the related tact switch (20) exceeds the chattering time that has been set according to the button input of the tact switch (20).

At this point, the control unit determines that the input of the tact switch (20) is valid when the time of the tact switch (20) being pressed exceeds the chattering time that has been set, and enables the touch input unit (30) that is installed on the tact switch (20) related to the valid input.

The touch input unit (30) in the enable state senses the touch of the user and, by performing calibration of the related touch signal so that a possible error due to the environment, for example, ambient temperature and humidity at the time of the touch input is reduced to the lowest level, determines whether the touch signal is a valid signal according to whether the strength duration of the related touch signal or other data satisfies a preset condition for validity.

At this point, if the touch input is invalid, it is not the button input generated by a user operation. Therefore, the control unit will disregard the related button input and does not perform the action related to the button input.

In contrast, if the touch input is valid, it is the user directly operating the tact switch (20). Therefore, the control unit (40) determines whether both the button input and the touch input are maintained for the preset time, as a result of which it performs an action related to the button input if both the button input and the touch input are maintained for the preset time.

At this point, the control unit (40) opens the door after transmitting an authentication key according to a request of RKE (Remote Keyless Entry System) by controlling the antenna unit (10) or transmits a wake-up signal to the vehicle, based on which the alarm on the vehicle is sounded or the emergency light blinks.

At this point, the wake-up signal is any one of the running signal of the alarm and the blinking signal of the emergency light. As long as the wake-up signal is a signal required for searching the vehicle location after confirming the operating state of the vehicle through a visible method or an audio method, various signals can also be included in addition to said running signal of the alarm and the blinking signal of the emergency light.

Furthermore, as described above, the control unit (40) enters the sleep mode and ends the action after performing the action related to the button input when the button input generated as the tact switch (20) is pressed and the touch input of the touch input unit (30) installed on the related tact switch (20) exist at the same time and these button input and touch input are maintained for the preset time.

Figure 4:
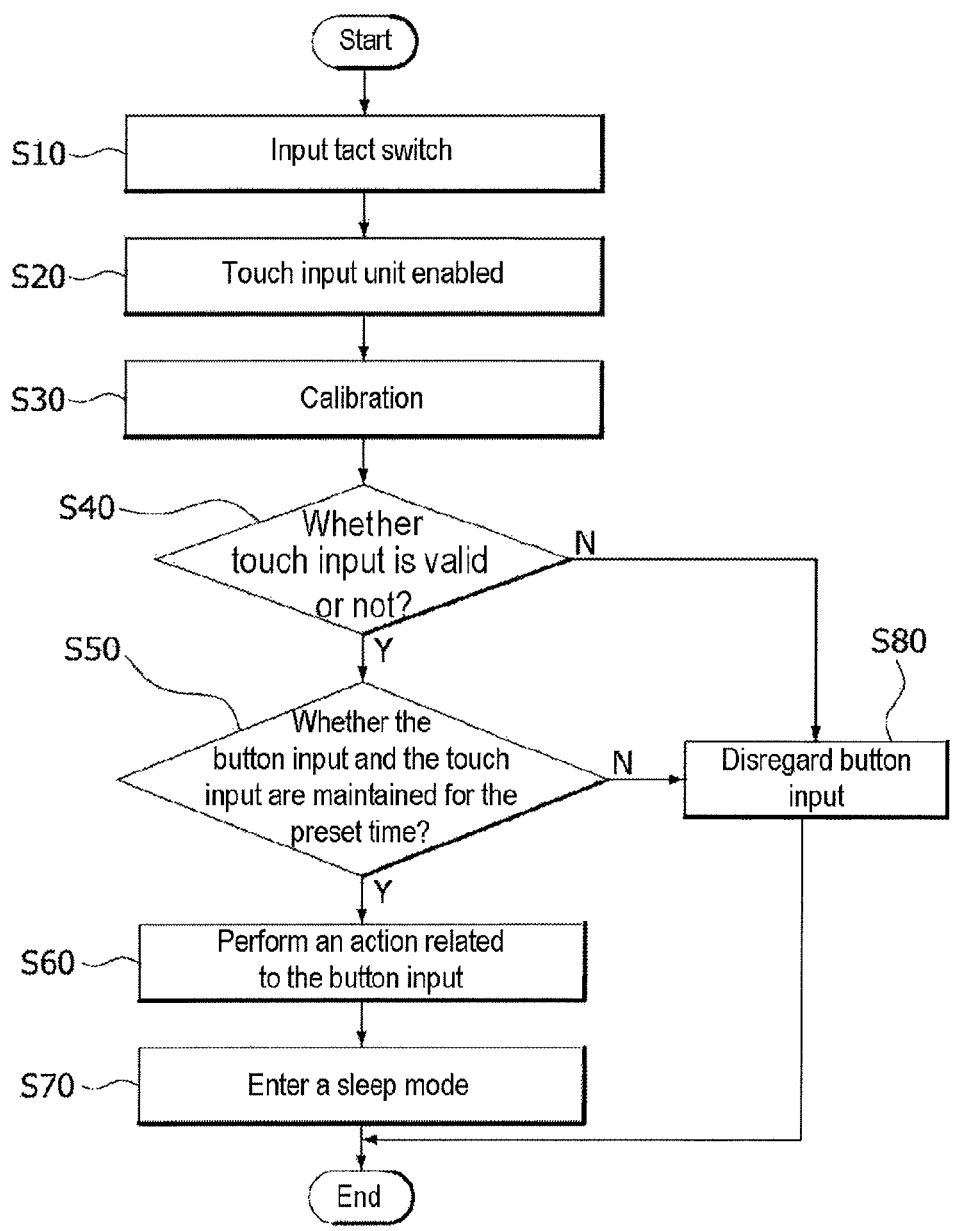
FIG. 4 is a sequence diagram of a control method of the vehicle card-type smart key in one embodiment of the present invention.

Next, FIG. 4 is referred to for describing a control method of a vehicle card-type smart key related to one embodiment of the present invention in detail.

FIG. 4 is a sequence diagram of a control method of a vehicle card-type smart key in one embodiment of the present invention.

First of all, the control unit (40) receives a button signal (S10) from the related tact switch (20) when the user presses the tact switch (20).

According to the button input of the tact switch (20), the control unit (40) confirms whether the time of the related tact switch (20) being pressed exceeds the chattering time or not. When the time of the tact switch (20) being pressed exceeds the chattering time, it is determined that the input of the related tact switch (20) is valid.

Then, the control unit (40) causes the touch input unit (30) installed on the tact switch (20) related to the determined valid input to be in an enable state (S20).

Thereafter, the touch input unit (30) which is enabled by the control unit (40) senses the touch of the user and, by performing calibration (S30) of the related touch signal so that a possible error due to the environment, for example, ambient temperature and humidity at the time of the touch input is reduced to the lowest level, the control unit (40) determines whether the related touch signal is a valid touch signal (S40) that is generated through a touch from the user according to whether the strength duration of the related touch signal or other data satisfies a preset condition for validity.

If the validity determination result related to the touch input is that the touch input is invalid, only the button input exists and it is not a button input generated by a user operation. Therefore, the control unit (40) disregards the button input (S80) of the related tact switch (20). At this point, the control unit (40) does not perform the action related to the button input of the tact switch (20).

In contrast, if the validity determination result related to the touch input is that the touch input is valid, both the button input and the touch input exist. Therefore, the control unit (40) determines whether both the button input of the tact switch (20) and the touch input of the touch input unit (30) are maintained for the preset time (S50).

That is, the control unit (40) determines whether both the button input and the touch input are maintained for the preset time, as a result of which it performs an action related to the button input (S60) if both the button input and the touch input are maintained for the preset time. At this point, it can be considered that the user continuously presses the tact switch (20) corresponding to an action in order to enable it to perform that action.

At this point, the control unit (40) opens the door after transmitting an authentication key according to a request of RKE (Remote Keyless Entry System) by controlling the antenna unit (10) or according to the touch input of the touch input unit (30), transmits a wake-up signal to the vehicle, based on which the alarm on the vehicle is sounded or the emergency light blinks.

The control unit (40) enters a sleep mode (S70) and ends the action after performing said action related to the button input.

As stated, according to the vehicle card-type smart key in one embodiment of the present invention, an action related to a button input is performed only when both a physical button input of the tact switch (20) and a touch input of the touch input unit (30) exist at the same time, so as to minimize an erroneous start caused by a button input.

Furthermore, according to the vehicle card-type smart key in one embodiment of the present invention, the action is performed only when there is a button input from the user; thus an unintentional erroneous start can be avoided and the phenomenon of shortening the battery life causing by generating an unnecessary current can be proactively prevented.

An aspect of the present invention is described by referring to the embodiments shown in the drawings, but the embodiments are just examples. A person with a common knowledge in the art can make various variations and derive embodiments of an equivalent range. Therefore, the true technical protection scope of aspects of the present invention should be determined by the following claims.

The invention claimed is:

1. A vehicle card-type smart key comprising:
a tact switch;
a touch input unit for sensing a touch from a user; and
a control unit which, when both a button input of said tact switch and a touch input of said touch input unit exist at a same time, and only when a duration of the button input of said tact switch and the touch input of said touch input unit exceed a preset time, performs an action related to the button input.

2. The vehicle card-type smart key according to claim 1, wherein said tact switch and said touch input unit are stacked.

3. The vehicle card-type smart key according to claim 2, wherein said touch input unit is embodied in said printed circuit board and said tact switch is installed on said touch input unit.

4. The vehicle card-type smart key according to claim 1, wherein said touch input unit is a capacitive sensor.

5. The vehicle card-type smart key according to claim 1, wherein when a time of said tact switch being pressed exceeds a chattering time that has been set, said control unit causes said touch input unit to be in an enable state.

6. The vehicle card-type smart key according to claim 5, wherein within a touch input time of said touch input unit, in order to minimize an error occurring due to the environment, said control unit performs calibration of the touch input from said touch input unit.

7. The vehicle card-type smart key according to claim 1, wherein said control unit enters a sleep mode after performing the action related to the button input.

8. A control method of the vehicle card-type smart key of claim 1, the method comprising:

a stage for the control unit to cause the touch input unit to be in an enable state when a button input is performed through the tact switch; and a stage for said control unit to perform an action related to the button input of said touch input unit when a touch input is performed through said touch input unit.

9. The control method of the vehicle card-type smart key according to claim 8, wherein: when a time of pressing of said tact switch exceeds a chattering time that has been set, said control unit causes said touch input unit to be in an enable state.

10. The control method of the vehicle card-type smart key according to claim 9, wherein: within a touch input time of said touch input unit, in order to minimize an error occurring due to the environment, said control unit performs calibration of the touch input from said touch input unit.

11. The control method of the vehicle card-type smart key according to claim 8, wherein: when both a button input of said tact switch and a touch input of said touch input unit exist at the same time, said control unit performs an action related to the button input.

12. The control method of the vehicle card-type smart key according to claim 8, wherein: when a duration of the button input of said tact switch and that of the touch input of said touch input unit exceed a preset time, the control unit performs an action related to the button input.

* * * * *